No. 865,986.   PATENTED SEPT. 17, 1907.
J. C. BARBER.
COMBINED CENTER AND SIDE BEARING FOR CARS.
APPLICATION FILED FEB. 16, 1907.
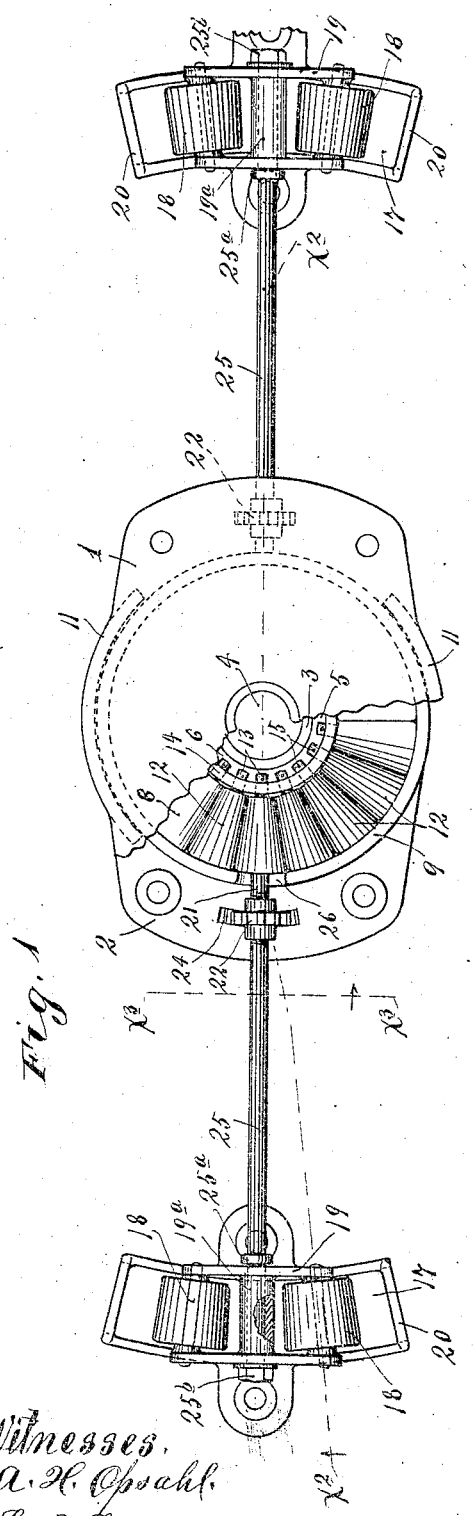
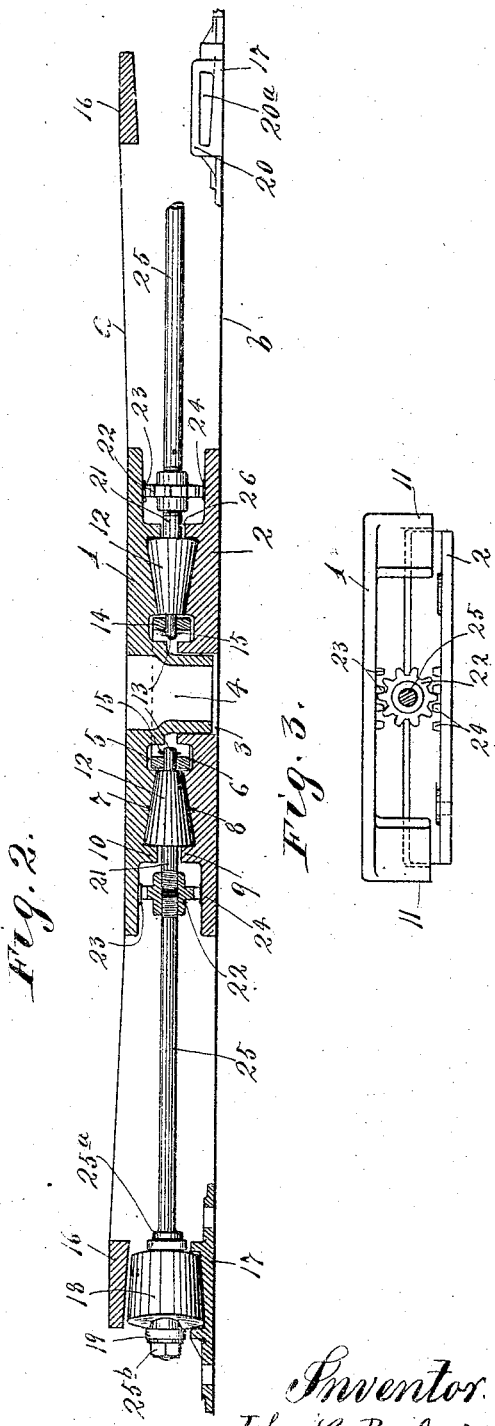
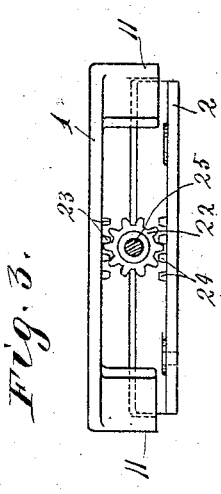
Witnesses
A. H. Opsahl
L. B. Losey
Inventor
John C. Barber
By his Attorneys
Williamson Merchant

UNITED STATES PATENT OFFICE.

JOHN C. BARBER, OF CHICAGO, ILLINOIS.

COMBINED CENTER AND SIDE BEARING FOR CARS.

No. 865,986. Specification of Letters Patent. Patented Sept. 17, 1907.

Application filed February 16, 1907. Serial No. 357,680.

*To all whom it may concern:*

Be it known that I, JOHN C. BARBER, a citizen of the United States, residing at Chicago, in the county of Cook and State of Illinois, have invented certain new and useful Improvements in a Combined Center and Side Bearing for Cars; and I do hereby declare the following to be a full, clear, and exact description of the invention, such as will enable others skilled in the art to which it appertains to make and use the same.

My invention relates to means for supporting car bodies from car trucks with freedom for oscillatory or pivotal movements, as required in traveling curves, and has for its especial object to provide an anti-friction combination center and side bearing for such purposes. To the above ends the invention consists of the novel devices and combinations of devices hereinafter described and defined in the claims.

Hitherto, anti-friction center bearings and anti-friction side bearings have been provided, but the action of the two devices has always been independent. In the ordinary arrangement, owing to the clearance between the rollers and upper members of the side bearings, the side bearing rollers will not travel unless their top sides are engaged with sufficient friction by the upper members of the side bearings, and as this engagement of the upper members of the side bearings with the side bearing rollers is not constant, but, on the contrary, is very uncertain, it has resulted that there has been no uniformity in the arc of travel of the rollers of the side bearings and of the center bearing, in rounding curves, and as the car body has more or less rocking motion, the load often rests only on one portion of the side bearing. Hence, it happens with the old or independently operative center and side bearings that the side bearings often become locked and inoperative and some times bent or broken.

My invention provides an arrangement which causes the rollers of the center bearing and of the side bearings to travel uniformly, that is, to travel in concentric circles through the same number of degrees of movement, and to do this, regardless of whether or not the rollers of the side bearings are continuously or intermittently pressed by the coöperating upper and lower members of the side bearings. Hence, the rollers and the upper and lower members of the side bearings are always maintained in proper relation with respect to each other, for proper coöperative action whenever the load is thrown onto the same. Otherwise stated, with my improved arrangement, it is impossible for the rollers of one or both of the side bearings to remain in an intermediate position when the rollers of the center bearing are moved to an extreme position, or, on the other hand, for the said roller side bearings to get into an extreme position while the rollers of the center bearing are in an intermediate position.

In the accompanying drawings which illustrate the invention, like characters indicate like parts throughout the several views.

Referring to the drawings, Figure 1 is a plan view, with some parts broken away, showing my improved combination center and side bearing. Fig. 2 is a vertical section taken on the line $x^2$ $x^2$ of Fig. 1, some parts being broken away, some parts being removed and some being shown in full; and Fig. 3 is a transverse section taken on the line $x^3$ $x^3$ of Fig. 1.

The line marked $a$ indicates the under surface of one of the body bolsters, and the line marked $b$ indicates the upper surface of one of the truck bolsters of a car, which bolsters may be of the usual or any suitable construction.

So far as the broad or generic feature of this invention is concerned, the center bearing and side bearings may take a great many different forms, but preferably I employ a center bearing of the general construction set forth and claimed in my pending U. S. application S. N. 347,108, filed December 10, 1906, entitled anti-friction center bearing for cars. Referring to this center bearing as illustrated in the drawings, the numeral 1 indicates the upper member, and the numeral 2 the lower member of the center bearing, the former of which is bolted or otherwise rigidly secured to the body bolster $a$, and the latter of which is bolted or otherwise rigidly secured to the truck bolster $b$. Said lower member 2 is formed with a central perforation 3, and the upper member 1 is formed with a depending sleeve or hub 4 that is telescoped into the perforation 3. Just outward of their hub portions, said bearing members 1 and 2 are formed with annular clearance grooves 5 and 6, respectively, that afford an annular clearance channel for a so-called retaining ring, presently to be described. Outward of the grooves 5 and 6, said members 1 and 2 are formed with outwardly diverging annular conical bearing surfaces or treads 7 and 8, respectively. At the outer extremity of the roller bearing surface 8, said lower member 2 is formed with an annular thrust flange 9, and outward of the roller bearing surface 7 said member 1 is formed with an annular stop shoulder 10. The said upper member 1 is also provided with depending segmental guard flanges 11 that overlap portions of the thrust flange or shoulder 9 of the lower member 2. These guard flanges 11 are so arranged that they resist buffing strains, but leave the sides of the center bearing open so that wind blowing between the upper and lower center bearing members may blow from between the rollers any dirt or dust which may have accumulated in the center bearing.

Conical bearing rollers 12 are interposed between the conical bearing surfaces 7 and 8 of the upper and lower bearing members. The outer and larger ends of these rollers 12 are rounded and engaged with and thrust against the vertically alined annular thrust shoulders 9 and 10 of the two bearing members. At their inner ends, the rollers 12 are formed with trunnions 13 that are journaled in a retaining ring 14. This retaining ring 14 travels with the rollers and works freely in the annular channel formed by the grooves 5 and 6. Pins or cotters 15 passed through the inner ends of the roller trunnions 13 hold the said rollers interlocked to the said retaining ring, but permit free rotation of the rollers.

As preferably constructed, each side bearing comprises an upper bearing member 16, a lower bearing member 17, bearing rollers 18 and a roller containing cage 19. The said bearing members 16 and 17 are secured, respectively, to the body bolster $a$ and truck bolster $b$, and they are formed with segmental inwardly converging conical bearing surfaces for engagement with the interposed conical side bearing rollers 19. The lower side bearing members 17 are formed with flanges 20 that follow the margins of the respective conical bearing surface of the said members 17. The end portions of these flanges 20 are formed with slots 20$^a$ (see Fig. 2) that permit dirt or dust to be blown off from the bearing surface bounded by the said flange 20. The said bearing rollers 18 are journaled in the coöperating cage 19, and each cage is formed with a central sleeve 19$^a$.

As a simple and efficient means for causing the rollers of the side bearings to travel in unison with the rollers of the center bearing, I provide a construction which, specifically described, is as follows: Those two center bearing rollers 12 that stand diametrically opposite to each other in a direction longitudinally of the truck bolster $b$ are shown as provided at their large ends with axially projecting stems or trunnions 21 that are screwed onto or otherwise rigidly secured to the hubs of spur gears or pinions 22. These gears or pinions 22 mesh with short segmental racks 23 and 24, respectively, on the upper and lower center bearing members 1 and 2.

So-called propelling rods 25 are screwed onto or otherwise rigidly secured to the hubs of the pinions 22 and extend radially outward in axial alinement with the corresponding roller stems 21. In fact, the said roller stems 21 really constitute parts of these so-called propelling rods. At their outer ends, these propelling rods 25 are passed loosely through the sleeves 19$^a$ of the roller cages 19. Just inward of the respective cages 19, the propeller rods 25 are provided with stop collars 25$^a$, and at their extreme outer ends are shown as provided with nuts 25$^b$. To afford clearance for the travel of the roller stems 21, the alined stop flanges or shoulders 9 and 10 are preferably cut away as shown at 26 (see Fig. 1).

With the construction above described, it is evident that when the center bearing members 1 and 2 move pivotally with respect to each other, positive rotation will be imparted to the so-called propeller rods 25 and to the connected rollers 12. The pinions 22 and segmental racks 23—24 should, of course, be constructed on such lines that the positive rotary movements imparted to the rods 25 will be the same as that imparted to the connected rollers 12, by their frictional engagement with the bearing members 1 and 2, thereby avoiding conflict between the two rotating forces. In fact, the frictional engagement of the bearing members 1 and 2 with the interposed rollers 12 will be sufficient to properly move the propeller rods 25, but under continued service some slippage might take place, and, consequently, the rollers might work from their original positions. The segmental racks and interposed pinions afford simple and efficient means for positively maintaining the proper relation between the movable parts of the center bearing and side bearings. It is, of course, evident that the outer ends of the propeller rods 25 travel through the same number of degrees of movement, but on the arc of a larger circle than the rollers 12, from which it of course must follow that the said bearing rollers 18 will always be given the same number of degrees of movement as the center bearing rollers, regardless of whether or not the said side bearing rollers are frictionally pressed between the coöperating upper and lower members of the side bearings.

What I claim is:

1. The combination with the upper and lower members of a center bearing, of conical rollers interposed between said bearing members, a retaining ring connecting the said conical rollers and traveling therewith, upper and lower members of a pair of side bearings, bearing rollers arranged in pairs and interposed between the upper and lower members of said side bearings, cages in which the said side roller bearings are journaled, and radially extended connections between the said cages and certain of the rollers of said center bearing, whereby the rollers of said center and side bearings are caused to travel in unison, substantially as described.

2. The combination with upper and lower members of a center bearing and conical rollers interposed between the same, of upper and lower members of a pair of side bearings, rollers interposed between the upper and lower members of said side bearings, cages in which said side roller bearings are journaled, radially extended rotary driving rods connected at their inner ends to and for rotation with axially alined members of the center bearing rollers, and journaled at their outer ends in the respective roller containing cages of said side bearings, pinions on said driving rods, and rack teeth on the upper and lower members of said center bearing, meshing with said pinions, substantially as described.

In testimony whereof I affix my signature in presence of two witnesses.

JOHN C. BARBER.

Witnesses:
MALIE HOEL,
F. D. MERCHANT.